United States Patent
Kim

(10) Patent No.: US 8,303,456 B2
(45) Date of Patent: Nov. 6, 2012

(54) GEAR TRAIN OF AUTOMATIC TRANSMISSION FOR VEHICLE

(75) Inventor: Woo Yeol Kim, Gunpo (KR)

(73) Assignee: Hyundai Motor Company, Seoul (KR)

( * ) Notice: Subject to any disclaimer, the term of this patent is extended or adjusted under 35 U.S.C. 154(b) by 484 days.

(21) Appl. No.: 12/614,971

(22) Filed: Nov. 9, 2009

(65) Prior Publication Data

US 2010/0184556 A1    Jul. 22, 2010

(30) Foreign Application Priority Data

Jan. 19, 2009    (KR) ........................ 10-2009-0004186

(51) Int. Cl.
*F16H 3/44*    (2006.01)
*F16H 37/06*    (2006.01)

(52) U.S. Cl. ......... 475/284; 475/285; 475/329; 475/330

(58) Field of Classification Search .......... 475/275–293, 475/303, 329, 330
See application file for complete search history.

(56) References Cited

U.S. PATENT DOCUMENTS

| | | | | |
|---|---|---|---|---|
| 6,863,635 B2 * | 3/2005 | Tsuga | | 475/275 |
| 6,884,197 B2 * | 4/2005 | Ishimaru et al. | | 475/271 |
| 6,935,985 B2 * | 8/2005 | Ishimaru | | 475/296 |
| 7,037,232 B2 * | 5/2006 | Ishimaru | | 475/275 |
| 7,052,431 B2 * | 5/2006 | Taguchi et al. | | 475/284 |
| 7,311,634 B2 * | 12/2007 | Shim | | 475/275 |
| 7,452,303 B2 * | 11/2008 | Seo | | 475/284 |
| 7,618,342 B2 * | 11/2009 | Kim | | 475/287 |
| 7,621,841 B2 * | 11/2009 | Kim | | 475/287 |
| 7,727,103 B2 * | 6/2010 | Seo | | 475/275 |
| 7,780,566 B2 * | 8/2010 | Seo | | 475/276 |
| 7,846,058 B2 * | 12/2010 | Kim | | 475/280 |
| 7,850,569 B2 * | 12/2010 | Seo et al. | | 475/281 |
| 7,854,678 B2 * | 12/2010 | Kim | | 475/276 |
| 8,029,405 B2 * | 10/2011 | Kim | | 475/280 |

* cited by examiner

*Primary Examiner* — Tisha Lewis
(74) *Attorney, Agent, or Firm* — Morgan, Lewis & Bockius LLP

(57) ABSTRACT

A gear train of an automatic transmission includes eight forward speeds and two reverse speeds to improve power delivery performance and to reduce fuel consumption, by controlling two simple planetary gear sets and one compound planetary gear set through four clutches and two brakes.

7 Claims, 3 Drawing Sheets

FIG. 2

| | C1 | C2 | C3 | C4 | B1 | B2 | F | gear ratio | step ratio |
|---|---|---|---|---|---|---|---|---|---|
| 1 | ● | | | | ○ | | ● | 4.562 | |
| 2 | ● | | | | | ● | | 2.780 | 1.641 |
| 3 | ● | ● | | | | | | 1.940 | 1.433 |
| 4 | ● | | ● | | | | | 1.606 | 1.208 |
| 5 | ● | | | ● | | | | 1.260 | 1.275 |
| 6 | | | ● | ● | | | | 0.942 | 1.337 |
| 7 | | ● | | ● | | | | 0.814 | 1.157 |
| 8 | | | | ● | | ● | | 0.680 | 1.198 |
| R1 | | | | | ● | | | −4.117 | |
| R2 | | | ● | | ● | | | −2.439 | |

GEAR TRAIN OF AUTOMATIC TRANSMISSION FOR VEHICLE

CROSS-REFERENCE TO RELATED APPLICATION

The present application claims priority to Korean Patent Application No. 10-2009-0004186 filed on Jan. 19, 2009, the entire contents of which are incorporated herein for all purposes by this reference.

BACKGROUND OF THE INVENTION

1. Field of the Invention

The present invention relates to a gear train of an automatic transmission for a vehicle that realizes eight forward speeds.

2. Description of Related Art

A typical shift mechanism of an automatic transmission utilizes a combination of a plurality of planetary gear sets. A gear train of such an automatic transmission changes rotating speed and torque received from a torque converter of the automatic transmission and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

A manual transmission that has too many speeds causes inconvenience of excessively frequent shifting operations to a driver. Therefore, the positive features of more shift-speeds are more important for automatic transmissions because an automatic transmission automatically controls shifting operations basically without needing manual operation.

In addition to various developments regarding four and five speed gear trains, a six speed automatic transmission has recently been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle having advantages of realizing eight forward speeds and two reverse speeds, improving power delivery performance, reducing fuel consumption, and improving reverse speed performance by controlling two simple planetary gear sets and one compound planetary gear set through four clutches and two brakes.

In an aspect of the present invention, the gear train of an automatic transmission for vehicle may include, a first planetary gear set PG1 that is a double pinion planetary gear set, and includes a first sun gear S1 that is operated as a fixed element, a first ring gear R1 that forms a first intermediate output path MOP1 to output a reduced rotation speed, and a first planetary carrier PC1 that forms an input path IP that is connected to an input shaft IS and forms a second intermediate output path MOP2 to output the same speed, a second planetary gear set PG2 that is a single pinion planetary gear set, and includes a second sun gear S2 that is directly connected to the first intermediate output path MOP1 to form a first intermediate input path MIP1, a second planetary carrier PC2 that forms a third intermediate output path MOP3, and a second ring gear R2 that is directly connected to the second intermediate input path MIP2 to form a second intermediate input path MIP2, a third planetary gear set PG3 that is a single pinion planetary gear set and a double pinion planetary gear set that are combined with each other to be a compound planetary gear set like a Ravingneaux type, and includes a third sun gear S3 that is engaged with a long pinion P1 to form first and second variable input paths VIP1 and VIP2 that are variably connected to the first intermediate output path MOP1 and the third intermediate output path MOP3, and is simultaneously operated as an optional fixed element, a third planetary carrier PC3 that is variably connected to the input shaft IS to form a fourth variable input path VIP4, and is simultaneously operated as a fixed element, a third ring gear R3 that is connected to an output shaft OS to form a final output path OP, and a fourth sun gear S4 that is engaged with a short pinion P2 to be variably connected to the first intermediate output path MOP1 and to form a third variable input path VIP3, and a plurality of friction members including a plurality of clutches that are disposed on the first, second, third, and fourth variable input paths (VIP1-VIP4) and a plurality of brakes (B1 and B2) that are disposed between an operating member as a fixed element and a transmission housing (H).

The plurality of friction members may include a first clutch C1 that is disposed on the third variable input path VIP3, a second clutch C2 that is disposed on the first variable input path VIP1, a third clutch C3 that is disposed on the second variable input path VIP2, a fourth clutch C4 that is disposed on the fourth variable input path VIP4, a first brake B1 that is disposed between the third planetary carrier PC3 and the transmission housing (H), and a second brake 132 that is disposed between the third sun gear S3 and the transmission housing (H).

The second and third clutches C2 and C3 and the first and second brakes B1 and B2 may be disposed between the second planetary gear set PG2 and the third planetary gear set PG3, and the first and fourth clutches C1 and C4 may be disposed in a rear side of the third planetary gear set PG3.

As stated above, the first and second planetary gear sets PG1 and PG2 that are simple planetary gear sets and the third planetary gear set PG3 that is a compound planetary gear set are controlled by the four friction elements of the clutches (C1, C2, C3, and C4) and two brakes B1 and B2 to realize eight forward speeds and two reverse speeds, and to improve power delivery performance and reduce fuel consumption.

Also, two friction elements are operated in the respective speeds, such that the capacity of the hydraulic pump is downsized and the control efficiency of the hydraulic pressure is improved.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart of frictional members employed in a gear train according to the exemplary embodiment of the present invention.

Figure 1:
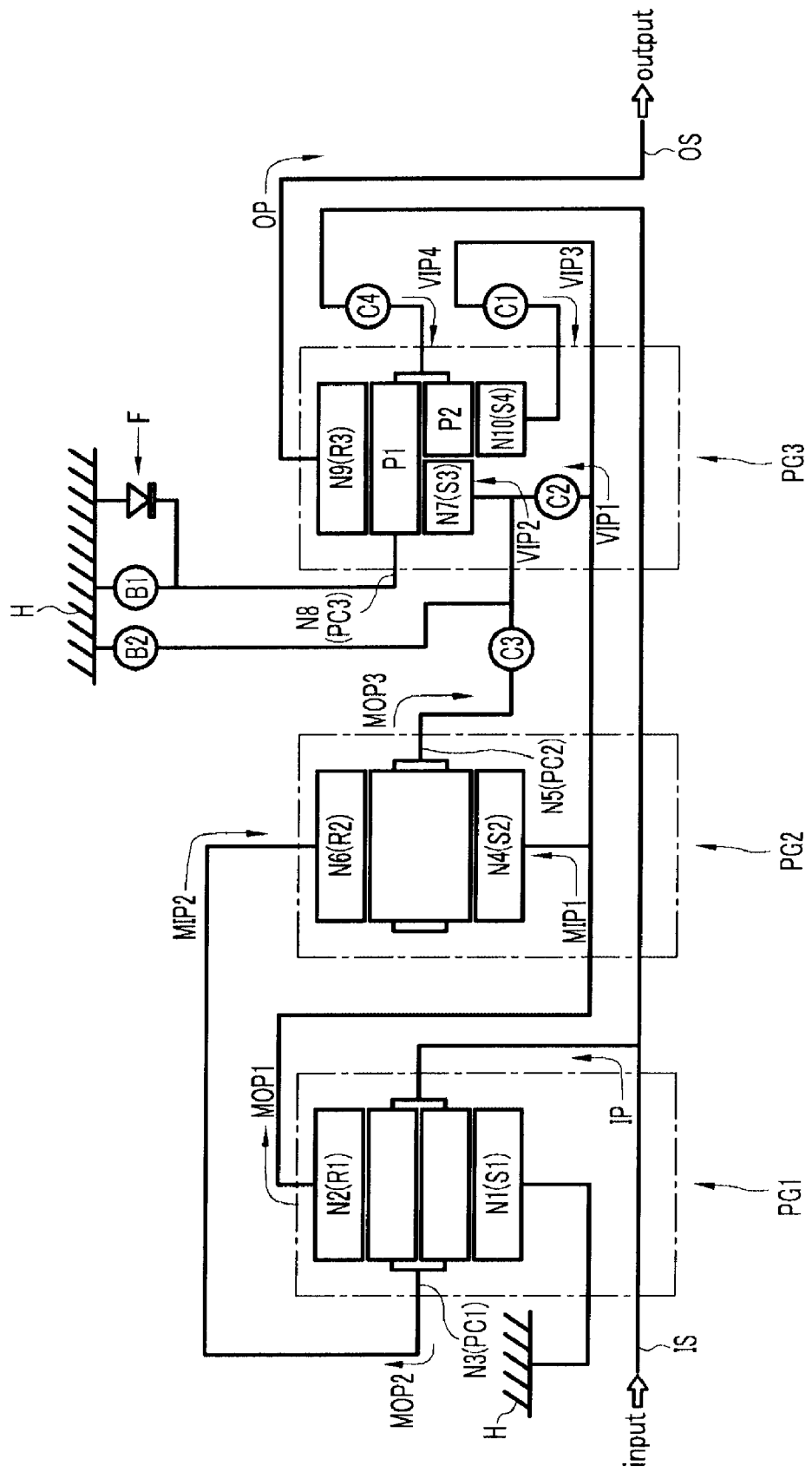
FIG. 1 is a schematic diagram of a gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

FIG. 1 is a schematic diagram of a gear train according to an exemplary embodiment of the present invention. A gear train of the present invention includes first, second, and third planetary gear sets PG1, PG2, and PG3 that are disposed on the same shaft axis, four clutches (C1, C2, C3, C4) as clutch means, and two brakes B1 and B2 as brake means.

Accordingly, rotational speed of an input shaft IS is changed via the first, second, and third planetary gear sets PG1, PG2, and PG3 and output through an output shaft OS. The first planetary gear set PG1 is disposed close to an engine and the second and third planetary gear sets PG2 and PG3 are sequentially disposed.

The input shaft IS is an input member and indicates a turbine shaft in a torque converter (not shown). The input shaft IS receives a converted engine torque from the torque converter, and the output shaft OS, which is an output member, outputs a drive torque to vehicle wheels through an output gear and a differential.

The first planetary gear set PG1 is a double pinion planetary gear set and includes a sun gear S1, a planet carrier PC1, and a ring gear R1 as three rotational elements according to a conventional art.

The first sun gear S1 is fixedly connected to a transmission housing H, and the first planetary gear PC1 is directly connected to the input shaft IS.

The first sun gear S1 as a first rotational element N1 is fixedly connected to the transmission housing H so that the first sun gear S1 is operated as a fixed element, the first ring gear R1 as a second rotational element N2 forms a first intermediate output path MOP1 to output a reduced rotation speed as an output element, and the first planetary carrier PC1 as a third rotational element N3 is directly connected to an input shaft IS to form an input path (IP) and simultaneously forms a second intermediate output path MOP2 to output the same speed as the input speed.

The second planetary gear set PG2 is a single pinion planetary gear set and includes a second sun gear S2, a planet carrier PC2, and a second ring gear R2, as is already known to a person skilled in the art.

In the second planetary gear set PG2, the second sun gear S2 is directly connected to the first ring gear R1 and the second ring gear R2 is directly connected to the first planetary carrier PC1.

As shown, a first intermediate input path MIP1 is formed between the second sun gear S2 of the second planetary gear set PG2 as the fourth rotational element N4 and the first intermediate output path MOP1 that is directly connected to the second rotational element N2, the second planetary carrier PC2 as the fifth rotational element N5 is an optionally fixed element to simultaneously form a third intermediate output path MOP3, and the second ring gear R2 as a sixth rotational element N6 forms a second intermediate input path MIP2 that is directly connected to the second intermediate output path MOP2 of the third rotational element N3.

According to such configurations, the different rotation speeds are transferred to the fourth rotational element N4 of the second sun gear S2 and the sixth rotational element N6 of the second ring gear R2, and the second planetary carrier PC2 outputs the single rotation speed.

The third planetary gear set PG3 includes a single pinion planetary gear set and a double pinion planetary gear set to have a Ravingneaux type of planetary gear set that shares the ring gear and the planetary carrier.

The third planetary gear set PG3 includes a third ring gear R3, a third planet carrier PC3, a third sun gear S3 engaged with a long pinion P1, and a fourth sun gear S4 engaged with a short pinion P2.

The third sun gear S3 as a seventh rotational element N7 forms first and second variable input paths VIP1 and VIP2 that are optionally connected to the first intermediate output path MOP1 of the first ring gear R1 and the third intermediate output path MOP3 of the second planetary carrier PC2, and simultaneously variably connected to the transmission housing (H).

The fourth sun gear S4 as a tenth rotational element N10 forms the third variable input path VIP3 that is variably connected to the first intermediate output path MOP1, the third planetary carrier PC3 as a eight rotational element N8 forms the fourth variable input path VIP4 that is variably connected to the input shaft IS, simultaneously the third planetary carrier PC3 is variably connected to a transmission housing (H) to operate as a fixed element, and the third ring gear R3 as a ninth rotational element N9 is directly connected to an output shaft OS to form a final output path (OP).

Here, the second clutch C2 is disposed on the first variable input path VIP1, the power of the first ring gear R1 is selectively transmitted to the third sun gear S3 according to the operation of the second clutch C2, the third clutch C3 is disposed on the second variable input path VIP2, and the power of the second planetary carrier PC2 is selectively transmitted to the third sun gear S3 according to the operation of the third clutch C3.

Also, the first clutch C1 is disposed on the third variable input path VIP3, the rotation of the first ring gear R1 is selectively transmitted to the fourth sun gear S4 depending on the operation of the first clutch C1, the fourth clutch C4 is disposed on the fourth variable input path VIP4, and the rotation of the input shaft IS is selectively transmitted to the third planetary carrier PC3 depending on the operation of the fourth clutch C4.

Also, the third planetary carrier PC3 and the third sun gear S3 are optionally fixed elements, and for this purpose the first brake B1 is disposed in parallel with the one-way clutch (F) between the third planetary carrier PC3 and the transmission housing (H) in the present invention, and the second brake B2 is disposed between the third sun gear S3 and the transmission housing (H).

The sequential order (the first, the second, the third . . . ) is given to the clutch and the brake so as to discriminate them, and the sequential order is determined from the element that is first operated in the shift-up process from the first forward speed.

With the scheme as described above, the rotational speed of the input shaft IS is transmitted to the first, second, and third planetary gear sets PG1, PG2, and PG3, and is changed into one of the eight forward speeds and two reverse speeds and output through the output path OP of the output shaft OS.

The first, second, third, and fourth clutches C1, C2, C3, and C4 and the first, second, and third brakes B1, B2, and B3 can be enabled as multi-plate hydraulic pressure friction devices that are frictionally engaged by hydraulic pressure.

Further, the second and third clutches C2 and C3 and the first and second brakes B1 and B2 are disposed between the second planetary gear set PG2 and the third planetary gear set PG3, and the first and fourth clutches C1 and C4 are disposed in the rear side of the third planetary gear set PG3.

FIG. 2 is an operational chart of frictional members employed in a gear train according to the exemplary embodiment of the present invention. As shown in FIG. 2, two friction elements are operated in each shift range.

That is, the first clutch C1 and the one-way clutch (F) are operated in the first forward speed.

The first clutch C1 and the second brake B2 are operated in the second forward speed.

The first and second clutches C1 and C2 are operated in the third forward speed.

The first and third clutches C1 and C3 are operated in the fourth forward speed.

The first and fourth clutches C1 and C4 are operated in the fifth forward speed.

The third and fourth clutches C3 and C4 are operated in the sixth forward speed.

The second and fourth clutch C2 and C4 are operated in the seventh forward speed.

The fourth clutch C4 and the second brake B2 are operated in the eighth forward speed.

The second clutch C2 and the first brake B1 are operated in the first reverse speed.

The third clutch C3 and the first brake B1 are operated for the speed to be changed in the second reverse speed.

The "o" in FIG. 2 means that the vehicle is in a coasting condition (i.e., a driver takes the foot from an accelerator pedal such that the vehicle may run by its momentum down a steep hill).

Figure 3:
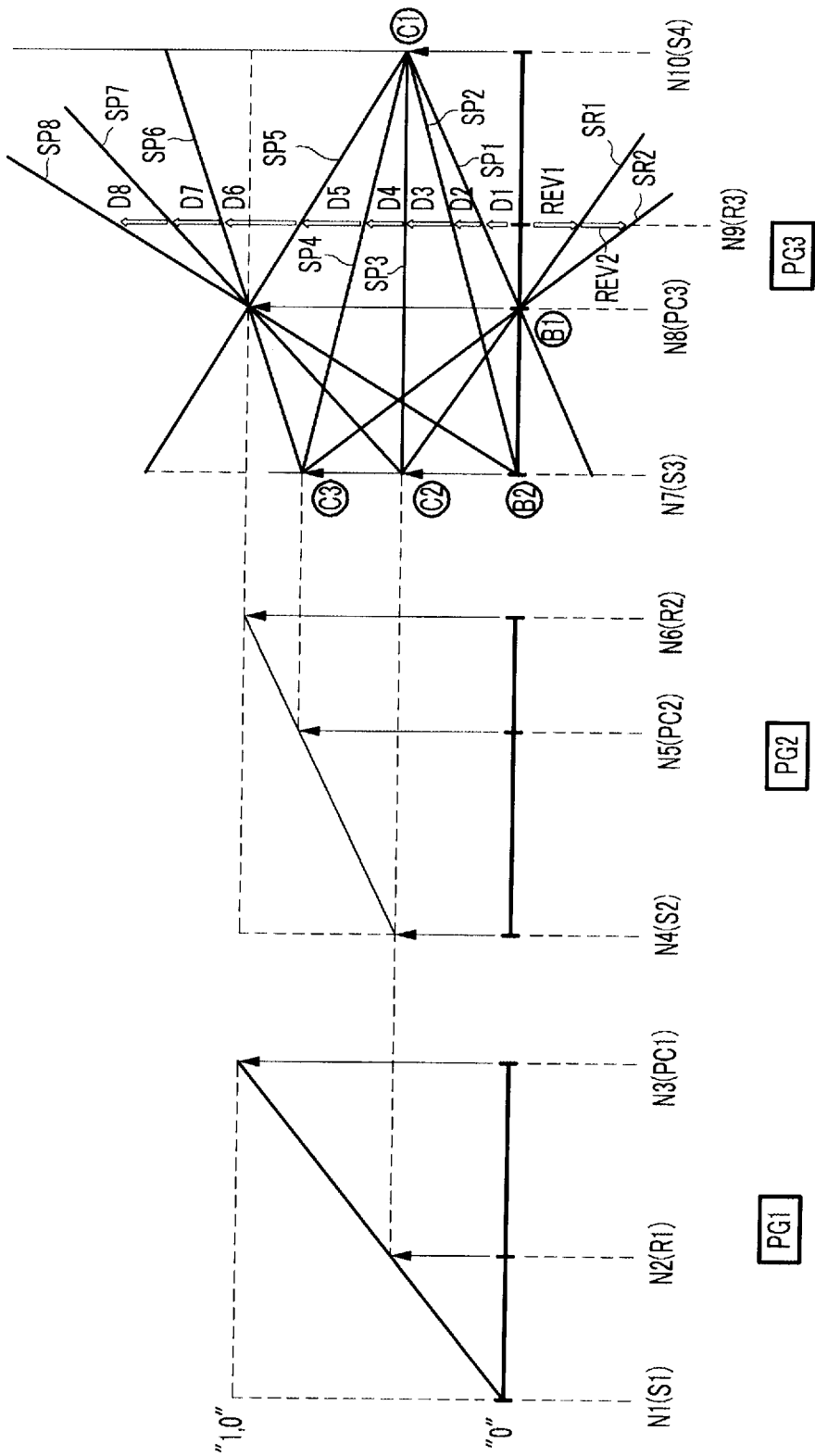
FIG. 3 is a lever diagram of a gear train according to an exemplary embodiment of the present invention.

FIG. 3 is a lever diagram of a gear train according to the first exemplary embodiment of the present invention. In FIG. 3, a lower horizontal line represents "0" rotational speed, and an upper horizontal line represents "1.0" rotational speed, which is the same as the rotational speed of the input shaft IS.

Three vertical lines of the first planetary gear set PG1 sequentially denote the first sun gear S1 as the first rotational element N1, the first ring gear R1 as the second rotational element N2, and the first planetary carrier PC1 of the third rotational element N3 from the left side, and distances between them are determined depending on a gear ratio (teeth number of sun gear/teeth number of ring gear) of the first planetary gear set PG1.

Three vertical lines of the second planetary gear set PG2 sequentially denote the second sun gear S2 as the fourth rotational element N4, the second planetary carrier PC2 as the fifth rotational element N5, and the second ring gear R2 as the sixth rotational element N6 from the left side, and distances between them are determined depending on a gear ratio (teeth number of sun gear/teeth number of ring gear) of the second planetary gear set PG2.

Four vertical lines of the third planetary gear set PG3 sequentially denote the third sun gear S3 as the seventh rotational element N7, the third planetary carrier PC3 as the eighth rotational element N8, the third ring gear R3 as the ninth rotational element N9, and the fourth sun gear S4 as the tenth rotational element N10 from the left side, and distances between them are determined depending on a gear ratio (teeth number of sun gear/teeth number of ring gear) of the third planetary gear set PG3.

Determining the positions of the rotational elements is obvious to a person skilled in the art, so a detailed explanation will be omitted.

First Forward Speed

In the first forward speed, the first clutch C1 and the one-way clutch (F) are operated as shown in FIG. 2.

Accordingly, in the first planetary gear set PG1, the first rotational element N1 is fixed and the rotation power is inputted to the third rotational element N3 through the input path (IP), the reduced rotation speed is outputted through the first intermediate output path MOP1, and simultaneously the same rotation speed is outputted through the second intermediate output path MOP2.

The rotation power of the first intermediate output path MOP1 and the second intermediate output path MOP2 are transmitted to the fourth rotational element N4 and the sixth rotational element N6 of the second planetary gear set PG2 through the first intermediate input path MIP1 and the second intermediate input path MIP2, and simultaneously the rotation power is transmitted to the tenth rotational element N10, that is, the fourth sun gear S4 of the third planetary gear set PG3, through the third variable input path VIP3 by the first clutch C1.

While the rotation power is inputted to the tenth rotational element N10 and the eighth operating element N8 is fixed by the first brake B1, the first speed line SP1 is formed in the third planetary gear set PG3, the speed with a length of D1 between the crossing point of the first speed line SP1 and the vertical line of the ninth rotational element N9 and the zero line (horizontal line) is outputted to generate the maximum gear ratio of 4.562 in the first forward speed (rotation speed of the input shaft IS/rotation speed of the output shaft OS).

At this time, the rotation is inputted to the second planetary gear set PG2 through the fourth rotational element N4 and the sixth rotational element N6, but this does not affect the gear shifting.

Second Forward Speed

The second brake B2 is operated to realize the second forward speed from the first forward speed.

That is, while the rotation power is inputted to the tenth rotational element N10 by the operation of the first clutch C1 as the first forward speed, the seventh rotational element N7 is a fixed element by the operation of the second brake B2 to form a second speed line SP2, and the speed with the length of D2 is outputted through the ninth rotational element N9 as an output element, therein the gear ratio is about 2.782 that is less than that of the first forward speed.

Third Forward Speed

As shown in FIG. 2, the second brake B2 that is operated in the second forward speed is released, and the second clutch C2 is operated in the third forward speed.

Then, like the above second forward speed, while the rotation power is inputted to the tenth rotational element N10 by the operation of the first clutch C1, the second clutch C2 is operated, such that the rotation power of the first intermediate output path MOP1 is simultaneously transferred to the seventh rotational element N7 and the tenth rotational element N10 and the third planetary gear set PG3 output the same speed as that of the input to form the third speed line SP3. The speed with the length of D3 is outputted through the N9 as an output element, and therein the gear ratio is about 1.940 that is less than that of the second forward speed.

Fourth Forward Speed

As shown in FIG. 2, the second clutch C2 that was operated during the third forward speed is released, and the third clutch C3 is operated in the fourth forward speed.

Then, like the third forward speed, while the rotation power is inputted to the tenth rotational element N10 by the operation of the first clutch C1, the third clutch C3 is operated, such that the rotation power of the third intermediate output path MOP3 is inputted to the seventh rotational element N7 through the second variable input path VIP2 to form the fourth speed line SP4. The speed with the length of D4 is outputted through the N9 as an output element, and therein the gear ratio is about 1.606 that is less than that of the third forward speed.

Fifth Forward Speed

As shown in FIG. 2, the first clutch C1 that was operated during the fourth forward speed is released, and the fourth clutch C4 is operated in the fifth forward speed.

Then, like the fourth forward speed, while the rotation power is inputted to the tenth rotational element N10 by the operation of the first clutch C1, the fourth clutch C4 is operated, such that the rotation power of the input shaft IS is inputted to the eighth rotational element N8 through the fourth variable input path VIP4 to form the fifth speed line SP5. The speed with the length of D5 is outputted through the N9 as an output element, and therein the gear ratio is about 1.260 that is less than that of the fourth forward speed.

Sixth Forward Speed

As shown in FIG. 2, the first clutch C1 that was operated during the fifth forward speed is released, and the third clutch C3 is operated in the sixth forward speed.

Then, like the fifth forward speed, while the rotation power is inputted to the eighth rotational element N8 by the operation of the fourth clutch C4 through the fourth variable input path VIP4, the third clutch C3 is operated, such that the rotation power of the third intermediate output path MOP3 is inputted to the seventh rotational element N7 through the second variable input path VIP2 to form a sixth speed line SP6. The speed with the length of D6 is outputted through the N9 as an output element, and therein the gear ratio is about 0.942 as an overdrive condition.

Seventh Forward Speed

As shown in FIG. 2, the third clutch C3 that was operated during the sixth forward speed is released, and the third clutch C2 is operated in the seventh forward speed.

Then, like the sixth forward speed, while the rotation power is inputted to the eighth rotational element N8 by the operation of the fourth clutch C4 through the fourth variable input path VIP4, the second clutch C2 is operated such that the rotation power of the first intermediate output path MOP1 is inputted to the seventh rotational element N7 through the first variable input path VIP1 to form the seventh speed line SP7. The speed with the length of D7 is outputted through the N9 as an output element, and therein the gear ratio is about 0.814 as an overdrive condition.

Eighth Forward Speed

As shown in FIG. 2, the third clutch C2 that was operated during the seventh forward speed is released, and the second brake B2 is operated in the eighth forward speed.

Then, like the fifth forward speed, while the rotation power is inputted to the eighth rotational element N8 by the operation of the fourth clutch C4 through the fourth variable input path VIP4, the second brake B2 is operated such that the seventh rotational element N7 is fixed to form the eighth speed line SP8. The speed with the length of D8 is outputted through the N9 as an output element, and therein the gear ratio is about 0.680 as an overdrive condition.

First Reverse Speed

As shown in FIG. 2, the second clutch C2 and the first brake B1 are operated in the first reverse speed.

Accordingly, while the rotation power is inputted to the third rotational element N3 through the input path(IP) in the first planetary gear set PG1, the first rotational element N1 is a fixed element, the reduced speed is outputted through the first intermediate output path MOP1, and the same speed is outputted through the second intermediate output path MOP2.

The rotation power of the first intermediate output path MOP1 and the second intermediate output path MOP2 are respectively transferred to the fourth rotational element N4 and the sixth rotational element N6 of the second planetary gear set PG2, and simultaneously the rotation power of the first intermediate output path MOP1 is transferred to the third sun gear S3 as the seventh rotational element N7 of the third planetary gear set PG3 through the first variable input path VIP1 by the second clutch C2.

Then, the rotation power is inputted to the seventh rotational element N7 of the third planetary gear set PG3, and the eighth operating element N8 is fixed by the operation of the first brake B1 to form a first reverse speed line SR1. The reverse speed is outputted with the length of REV1 from zero to the first reverse speed line SR1, and therein the gear ratio is −4.117.

At this time, the fourth rotational element N4 and the sixth rotational element N6 are rotated in the second planetary gear set PG2, but these rotations do not affect shifting.

Second Reverse Speed

As shown in FIG. 2, the second clutch C2 that was operated during the first reverse speed is released, and the third clutch C3 is operated in the second reverse speed.

Then, like the first reverse speed, while the eighth rotational element N8 is fixed by the operation of the first brake B1, the third clutch C3 is operated such that the rotation power of the third intermediate output path MOP3 is transferred to the seventh rotational element N7 through the second variable input path VIP2 to form a second reverse speed line SR2. The reverse speed is outputted with the length of REV2 from zero to the second reverse speed line SR2, and therein the gear ratio is −2.439.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

More specifically, omitting a one-way brake (F) that is disposed corresponding to the first brake B1 and operating the first brake B1 in the first forward speed are known to a person of ordinary skill in this art.

For convenience in explanation and accurate definition in the appended claims, the term "rear" is used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for a vehicle, comprising:
    a first planetary gear set (PG1) that is a double pinion planetary gear set, and includes a first sun gear (S1) that is operated as a fixed element, a first ring gear (R1) that forms a first intermediate output path (MOP1) to output a reduced rotation speed, and a first planetary carrier (PC1) that forms an input path (IP) that is connected to an input shaft (IS) and forms a second intermediate output path (MOP2) to output the same speed;
    a second planetary gear set (PG2) that is a single pinion planetary gear set, and includes a second sun gear (S2) that is directly connected to the first intermediate output path (MOP1) to form a first intermediate input path (MIP1), a second planetary carrier (PC2) that forms a third intermediate output path (MOP3), and a second ring gear (R2) that is directly connected to the second intermediate input path (MIP2) to form a second intermediate input path (MIP2);
    a third planetary gear set (PG3) that is a single pinion planetary gear set and a double pinion planetary gear set that are combined with each other to be a Ravigneaux compound planetary gear set, and includes a third sun gear (S3) that is engaged with a long pinion (P1) to form first and second variable input paths (VIP1) and (VIP2) that are variably connected to the first intermediate output path (MOP1) and the third intermediate output path (MOP3), and is simultaneously operated as an selectively fixed element, a third planetary carrier (PC3) that is variably connected to the input shaft (IS) to form a fourth variable input path (VIP4), and is simultaneously operated as a fixed element, a third ring gear (R3) that is connected to an output shaft (OS) to form a final output path (OP), and a fourth sun gear (S4) that is engaged with a short pinion (P2) to be variably connected to the first intermediate output path (MOP1) and to form a third variable input path (VIP3); and
    a plurality of friction members including a plurality of clutches that are disposed on the first, second, third, and fourth variable input paths (VIP1-VIP4) and a plurality of brakes (B1 and B2) that are disposed between an operating member as a fixed element and a transmission housing (H).

2. The gear train of an automatic transmission for a vehicle of claim 1, wherein the plurality of friction members include:
    a first clutch (C1) that is disposed on the third variable input path (VIP3);
    a second clutch (C2) that is disposed on the first variable input path (VIP1);
    a third clutch (C3) that is disposed on the second variable input path (VIP2);
    a fourth clutch (C4) that is disposed on the fourth variable input path (VIP4);
    a first brake (B1) that is disposed between the third planetary carrier (PC3) and the transmission housing (H); and
    a second brake (B2) that is disposed between the third sun gear (S3) and the transmission housing (H).

3. The gear train of an automatic transmission for a vehicle of claim 2, wherein:
    the first clutch (C1) and a one-way clutch F are operated in a first forward speed;
    the first clutch (C1) and the second brake (B2) are operated in a second forward speed;
    the first and second clutches (C1) and (C2) are operated in a third forward speed;
    the first and third clutches (C1) and (C3) are operated in a fourth forward speed;
    the first and fourth clutches (C1) and (C4) are operated in a fifth forward speed;
    the third and fourth clutches (C3) and (C4) are operated in a sixth forward speed;
    the second and fourth clutches (C2) and (C4) are operated in a seventh forward speed;
    the fourth clutch (C4) and the second brake (B2) are operated in an eighth forward speed;
    the second clutch (C2) and the first brake (B1) are operated in a first reverse speed; and
    the third clutch (C3) and the first brake (B1) are operated in a second reverse speed, such that the gears are changed.

4. The gear train of an automatic transmission for a vehicle of claim 2, wherein the first brake (B1) is disposed in parallel with a one-way clutch (F).

5. The gear train of an automatic transmission for a vehicle of claim 4, wherein:
    the first clutch (C1) and the one-way clutch F are operated in a first forward speed;
    the first clutch (C1) and the second brake (B2) are operated in a second forward speed;
    the first and second clutches (C1) and (C2) are operated in a third forward speed;
    the first and third clutches (C1) and (C3) are operated in a fourth forward speed;
    the first and fourth clutches (C1) and (C4) are operated in a fifth forward speed;
    the third and fourth clutches (C3) and (C4) are operated in a sixth forward speed;
    the second and fourth clutches (C2) and (C4) are operated in a seventh forward speed;
    the fourth clutch (C4) and the second brake (B2) are operated in an eighth forward speed;
    the second clutch (C2) and the first brake (B1) are operated in a first reverse speed; and
    the third clutch (C3) and the first brake (B1) are operated in a second reverse speed, such that the gears are changed.

6. The gear train of an automatic transmission for a vehicle of claim 2, wherein the second and third clutches (C2) and (C3) and the first and second brakes (B1) and (B2) are disposed between the second planetary gear set (PG2) and the third planetary gear set (PG3), and the first and fourth clutches (C1) and (C4) are disposed in a rear side of the third planetary gear set (PG3).

7. A gear train of an automatic transmission for a vehicle, comprising:
- a first planetary gear set (PG1) that is a double pinion planetary gear set, and includes a first sun gear (S1) that is directly connected to a transmission housing (H), a first ring gear (R1) that outputs a reduced rotation speed, and a first planetary carrier (PC1) that is directly connected to an input shaft (IS);
- a second planetary gear set (PG2) that is a single pinion planetary gear set, and includes a second sun gear (S2) that is directly connected to the first ring gear (R1), a second planetary carrier (PC2) that is operated as an output element, and a second ring gear (R2) that is directly connected to the first planetary carrier (PC1); and
- a third planetary gear set (PG3) that is a single pinion planetary gear set and a double pinion planetary gear set that are combined with each other to be a Ravigneaux compound planetary gear set, and includes a third sun gear (S3) that is engaged with a long pinion (P1) to be variably connected to the second sun gear (S2) and the second planetary carrier (PC2) through the second sun gear (S2) and the second planetary carrier (PC2) and simultaneously connected to the transmission housing (H) through a second brake (B2), a third planetary carrier (PC3) that is connected to the input shaft (IS) through a fourth clutch (C4) and is simultaneously connected to the transmission housing (H) through a first brake (B1) that is disposed in parallel with a one-way clutch (F), a third ring gear (R3) that is connected to an output shaft (OS), and a fourth sun gear (S4) that is engaged with a short pinion (P2) to be connected to the second sun gear (S2) through a first clutch (C1).

* * * * *